A. M. EASTWICK.
Car Propeller
2 Sheets—Sheet 1.
No. 471.
Patented Nov. 20, 1837.
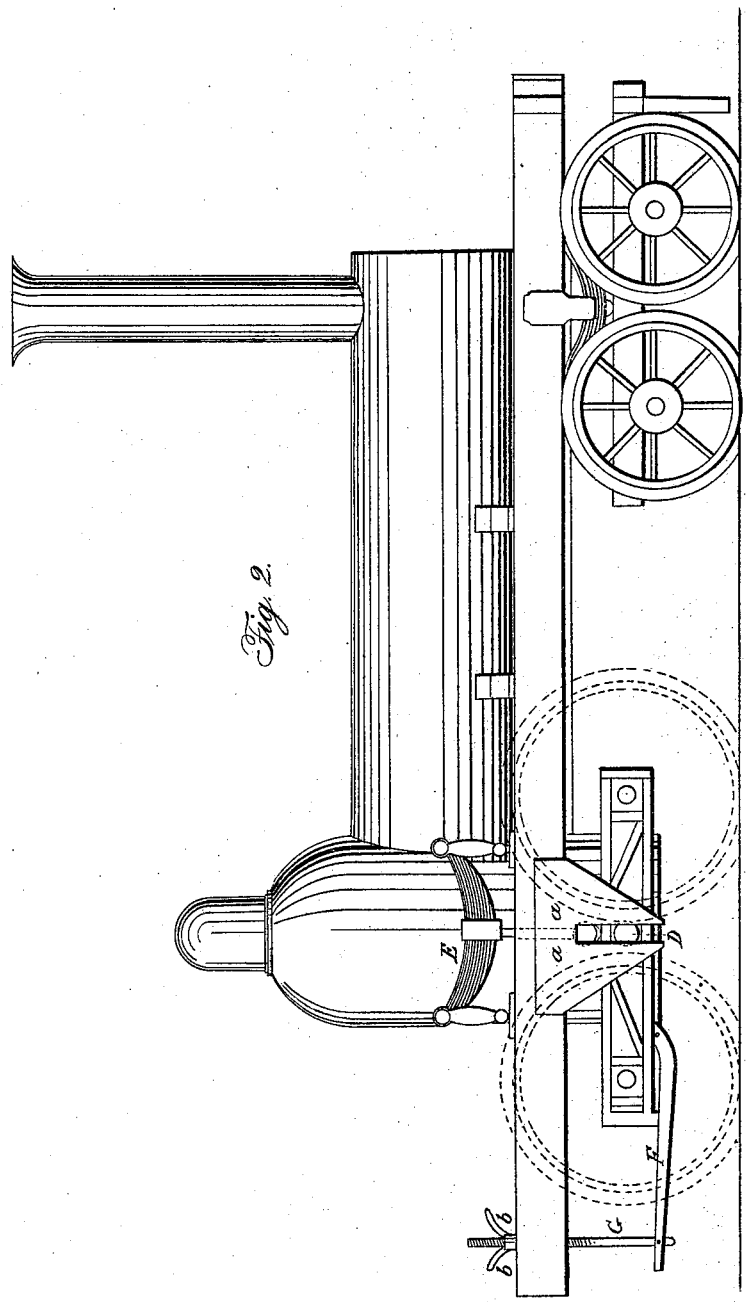

A. M. EASTWICK.
Car Propeller
No. 471.
2 Sheets—Sheet 2.
Patented Nov. 20, 1837.
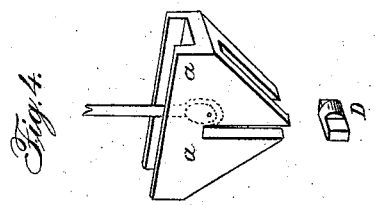
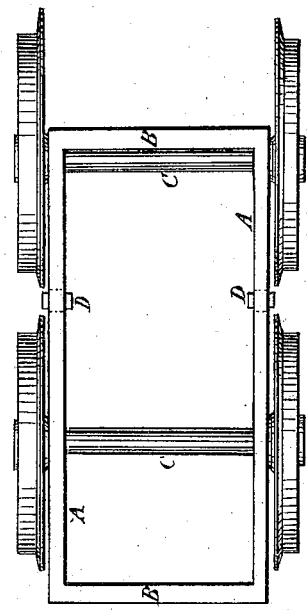
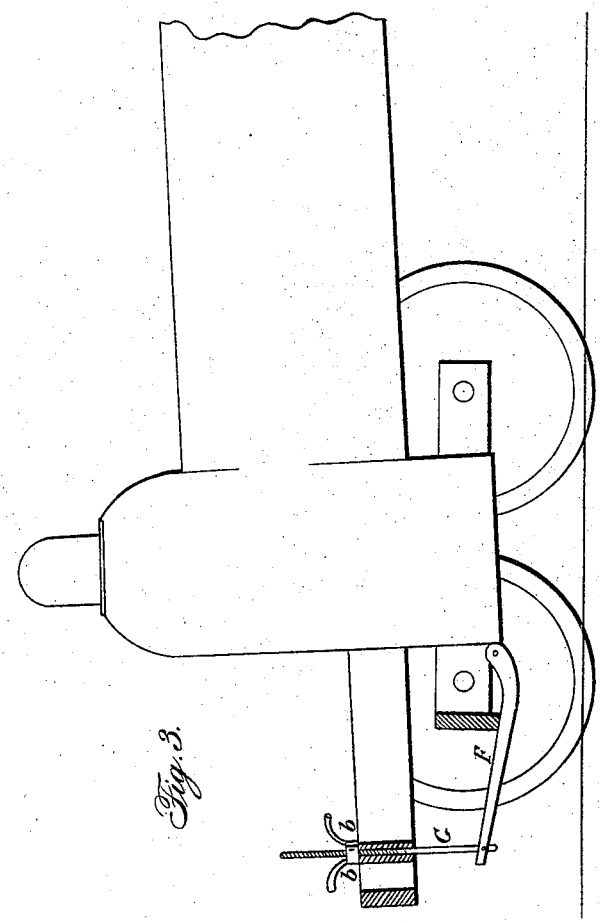

UNITED STATES PATENT OFFICE.

ANDREW M. EASTWICK, OF PHILADELPHIA, PENNSYLVANIA.

MODE OF APPLYING THE DRIVING-WHEELS OF LOCOMOTIVE-ENGINES.

Specification of Letters Patent No. 471, dated November 20, 1837.

*To all whom it may concern:*

Be it known that I, ANDREW M. EASTWICK, of the city of Philadelphia, in the State of Pennsylvania, have invented an improvement in the mode of applying the driving-wheels to locomotive-engines by which the pressure upon the rails is distributed and equalized and the action of the wheels increased; and I do hereby declare that the following is a full and exact description thereof.

In my locomotive engine I use eight wheels, two pairs of driving and two pairs of guide wheels, the latter not differing at all in the manner of arrangement or operation from such as have been heretofore employed; my improvement consisting entirely in the mode in which I construct an independent frame, or truck, to receive the axles of the four driving wheels, and in which I connect the same with the main frame of the locomotive.

Figure 1, represents the four driving wheels with their frame, or truck, A, A, being the sides, and B, B, the ends of the said independent frame or truck. C, C, are the axles of the wheels, running in proper bearings in the side pieces A, A, of the frame. Through the middle of each of these side pieces there are round holes, bored true, to receive two short axles, or bearing pieces, D, D, which project out on either side of the frame to a distance equal to the thickness of the pedestals which embrace the side pieces, and which have suitable notches, or openings into which the projecting ends of the short axles are to pass, these ends being cut, or notched, as shown in the drawing, to enable them to slide within the openings.

Fig. 2, is a side view of the locomotive with the driving and guide wheels in place; one of the short axles, or bearing pieces, being seen in the opening of the pedestal *a*, *a*, see also Fig. 4, in which it slides up and down freely, obeying the motion of the spring E, the bearing rod, or bolt, from which acts upon the center of the independent truck, or frame, of the driving wheels. It will be seen that the frame of the driving wheels having always the whole bearing of the load upon them in the center, will transfer that bearing equally on to each of the wheels, so that notwithstanding any inequality, or undulation in the rails, the wheels will still, under all circumstances sustain an equal portion of the weight, on each of their four points of contact with the rail. I am aware that four driving wheels have been previously used, but as these have had the bearings of their axles on the main frame of the locomotive, they have not performed the office of distributing the weight, and of equalizing the adhesion; every inequality of the road when the wheels are thus fixed, tending only, alternately, to increase and to diminish the pressure on each pair of wheels.

It is found, sometimes, desirable to throw nearly the whole weight of the locomotive upon the driving wheels, leaving no more upon the guide wheels than is necessary to keep them in operation upon the road; and this object I effect, when requisite, by a contrivance equally simple, and effective.

Fig. 3, is a section of so much of the hind part of the locomotive as is necessary for the purpose of representing this contrivance. F, is a bar, jointed to the lower side of the engine, and extending back so that it may be made to bear upon the under side of the back rail of the independent frame, or truck. From this bar a bolt G passes up through the main frame of the locomotive, and by tightening a screw nut *b*, *b*, upon the upper end of the bolt G, it will be readily perceived that the weight of the opposite end of the locomotive may be taken off from the guide wheels, and thrown upon the driving wheels, to any extent that may be desired. It will be seen also by any competent machinist, that other means than the employment of a screw bolt may be adapted for effecting this object.

The load to be drawn may be attached to a toggle joint, or other contrivance connecting the bar F, and the frame of the locomotive, in such a way as shall tend to raise the opposite end of the locomotive, and that in a degree proportioned to the resistance. I do not intend therefore to limit myself to any precise mode of effecting this object, but to adopt any means of attaining the end which are substantially similar to those which I have pointed out.

What I claim as my invention, and wish to secure by Letters Patent, is—

1. The employment of four driving wheels in a locomotive engine, in such a manner as that these wheels shall have the bearings of their axles in an independent frame, or truck, connected with the main frame of the locomotive, substantially in the way herein described.

2. I also claim the transferring of any portion of the weight usually borne by the guide wheels, on the driving wheels, upon the principle by me set forth.

A. M. EASTWICK.

Witnesses:
W. THOMPSON,
LINTON THORN.